US007095952B2

United States Patent
Lelkes

(10) Patent No.: US 7,095,952 B2
(45) Date of Patent: Aug. 22, 2006

(54) METHOD FOR OPTIMIZING THE EFFICIENCY OF A MOTOR OPERATED UNDER A LOAD

(75) Inventor: Andras Lelkes, Bad Duerheim (DE)

(73) Assignee: Minebea Co., Ltd., Nagano-Ken (JP)

( * ) Notice: Subject to any disclaimer, the term of this patent is extended or adjusted under 35 U.S.C. 154(b) by 31 days.

(21) Appl. No.: 10/996,278

(22) Filed: Nov. 23, 2004

(65) Prior Publication Data

US 2005/0141887 A1    Jun. 30, 2005

(30) Foreign Application Priority Data

Nov. 28, 2003  (DE)  ................. 103 55 651

(51) Int. Cl.
*H02P 7/28* (2006.01)

(52) U.S. Cl. .............. 388/813; 318/254; 318/439; 318/138; 388/800; 388/809

(58) Field of Classification Search ................. 388/813, 388/800, 809; 318/254, 439, 138
See application file for complete search history.

(56) References Cited

U.S. PATENT DOCUMENTS

| | | | | |
|---|---|---|---|---|
| 4,460,861 A * | 7/1984 | Rosa | ............................ | 318/722 |
| 5,847,524 A * | 12/1998 | Erdman et al. | .............. | 318/439 |
| 5,995,710 A * | 11/1999 | Holling et al. | .............. | 388/811 |
| 6,154,002 A * | 11/2000 | Izumisawa et al. | .......... | 318/721 |
| 6,809,497 B1 * | 10/2004 | Kudo et al. | .................. | 318/727 |
| 2004/0021437 A1 * | 2/2004 | Maslov et al. | ............... | 318/254 |

* cited by examiner

*Primary Examiner*—Rita Leykin

(57) ABSTRACT

The invention relates to a method to optimize the efficiency of a motor operated under a load having an essentially quadratic characteristic curve, the motor being connected to a motor control with whose aid at least one free motor parameter w can be changed to influence the efficiency.

According to the invention, the rotational speed n and the input power $P_E$ are determined and the motor parameter w is adjusted to a value at which the value E representing the quotient of the cube of the rotational speed n and the input power $P_E$ attains a maximum.

10 Claims, 4 Drawing Sheets

Fig. 3a

METHOD FOR OPTIMIZING THE EFFICIENCY OF A MOTOR OPERATED UNDER A LOAD

BACKGROUND OF THE INVENTION

The invention relates to a method for optimizing the efficiency of a motor operated under a load, in particular a motor to drive fans or pumps.

OUTLINE OF THE PRIOR ART

In many motor controls there are free parameters which can be used to optimize various characteristics of the motor such as its efficiency. This kind of efficiency optimization would allow the motor to always operate at optimum efficiency irrespective of a number of factors, such as rotational speed, torque, power supply voltage, temperature etc. Despite this, however, most fan and pump drives frequently operate with relatively low efficiency particularly in the partial load range.

Brushless DC motors are often used to drive fans or pumps. These motors are connected to an electronic motor control which looks after the power supply to the motor and the respective commutation (commutation angle) of the motor windings. The commutation angle can be adjusted as a free motor parameter and influences not only the torque-rotational speed characteristic curve but also the efficiency of the motor.

Should we wish to optimize the efficiency, it has first to be recorded or calculated. The efficiency of a motor is the ratio of mechanical output power to electrical input power. Recording the mechanical output power is particularly complex. Output power is the product of rotational speed and torque. Although sensors to measure torque are available, they are both bulky and very expensive so that their application for fan or pump drives is practically out of question.

Automatic efficiency optimization enables not only the motor's energy consumption to be reduced, but also the useful life of the system to be increased due to low self-heating of the motor and the power electronics.

SUBJECT MATTER OF THE INVENTION

It is thus the object of the invention to reveal a simple method by means of which the efficiency of a motor operated under a load having an essentially quadratic load characteristic curve can be automatically optimized during operation by changing at least one free parameter without it being necessary to measure the efficiency, the torque or the mechanical output power.

This method is based on the rotational speed n of the motor and the input power $P_E$ being repeatedly determined either directly or indirectly and the chosen motor parameter being adjusted to a value in which a value E attains its maximum, E representing the quotient of the cube of the rotational speed -n and the input power $P_E$.

According to the invention, here a well-known natural law governing the relationship between torque and rotational speed is made use of. Pumps and fans have a quadratic torque-rotational speed characteristic curve. For the sake of simplicity, only fan drives shall be considered below. The invention can of course be equally applied to drives for ventilators and pumps and generally to any systems having quadratic torque-rotational speed characteristic curves.

The quadratic characteristic curve of a fan means that the torque (m) that is necessary to drive the rotor disk is proportional to the square of the rotational speed (n):

$$m = Kn^2 \quad (1)$$

The mechanical power, that is to say the output power $P_A$ of a motor, is the product of mechanical circular velocity ($\omega$) and torque (m):

$$P_A = m\omega = m 2\pi n/60 \quad (2)$$

rotational speed (n) being expressed as revolutions per minute ($\min^{-1}$).

Equations (1) and (2) then result in:

$$P_A = K 2\pi n^3/60 \quad (3)$$

Using the factor $k = 2\pi K/60$, this relationship can be expressed more simply:

$$P_A = kn^3 \quad (4)$$

The efficiency ($\eta$) of a motor is the ratio of mechanical output power $P_A$ to (electrical) input power $P_E$:

$$\eta = P_A/P_E = kn^3/P_E \quad (5)$$

It is relatively easy to measure the input power $P_E$. In the case of an electric motor, only electric parameters need be measured. And for an internal combustion engine, input power can also be relatively easily measured using fuel consumption. Mechanical output power $P_A$, which is relatively difficult to measure, need no longer be determined in order to calculate efficiency.

Unfortunately, factor k is dependent on many external influences. In fans, for example, k depends primarily on the flow resistance of the air duct. The invention takes advantage of the fact that although factor k is not constant, it is independent of the drive motor and of the control of the motor. This means that efficiency ($\eta$) can be expressed by a value $E = \eta/k$ which has now to be optimized:

$$E = \eta/k = n^3/P_E \quad (6)$$

Since factor k is independent of the motor and the motor control, the maximum of value E—assuming the parameter setting of the motor remains constant—corresponds to maximum efficiency $\eta$. Thus according to the invention, value E can be invoked for the maximization of efficiency.

The advantage of the method according to the invention lies in the fact that the rotational speed (n) of the motor can be easily measured, usually involving low costs. It is also easy to determine the electric input power $P_E$. In the case of electric motors with a DC supply or for converter supplied motors, the input power can be calculated from the direct current ($I_{DC}$) and the DC voltage ($U_{DC}$) of the supply voltage or of the intermediate circuit:

$$P_E = I_{DC} U_{DC} \quad (7)$$

Thus here:

$$E = n^3/P_E = n^3/I_{DC} U_{DC} \quad (8)$$

If the voltage $U_{DC}$ can be taken as a constant, instead of factor E a modified factor E* can be optimized to advantage:

$$E^* = E\, U_{DC} = n^3/I_{DC} \quad (9)$$

In the case of a brushless DC motor, for example, the information on rotational speed is available practically free of charge since the motor control requires information on the position of the rotor for commutation purposes, and both the rotational speed (n) as well as its cube ($n^3$) can be mathematically derived with ease from this positional information. Since nowadays an increasing number of motor controls, including those in the fan industry as well, contain their own microcontrollers, this kind of calculation poses no problem. It is also relatively easy to measure the direct current $I_{DC}$ consumed by the motor. That is why the invention provides a considerably simplified method compared to the measurement or calculation of torque.

The advantage of the invention thus lies in the fact that efficiency η can be optimized without its having to be measured or calculated. This not only goes to cut the costs of the control arrangement and to make it more compact, but also to make it more reliable. This means of efficiency optimization, which can also be applied in practice in this way, allows energy to be saved, motor capacity utilization to be raised and/or the useful life of the motor to be increased.

DESCRIPTION OF A PREFERRED
EMBODIMENT OF THE INVENTION

The following embodiment is used to describe how the invention can be put into practical application in a brushless DC motor. The basic idea of the invention can, however, be used in any electric or non-electric drives having a quadratic characteristic curve.

Figure 1:
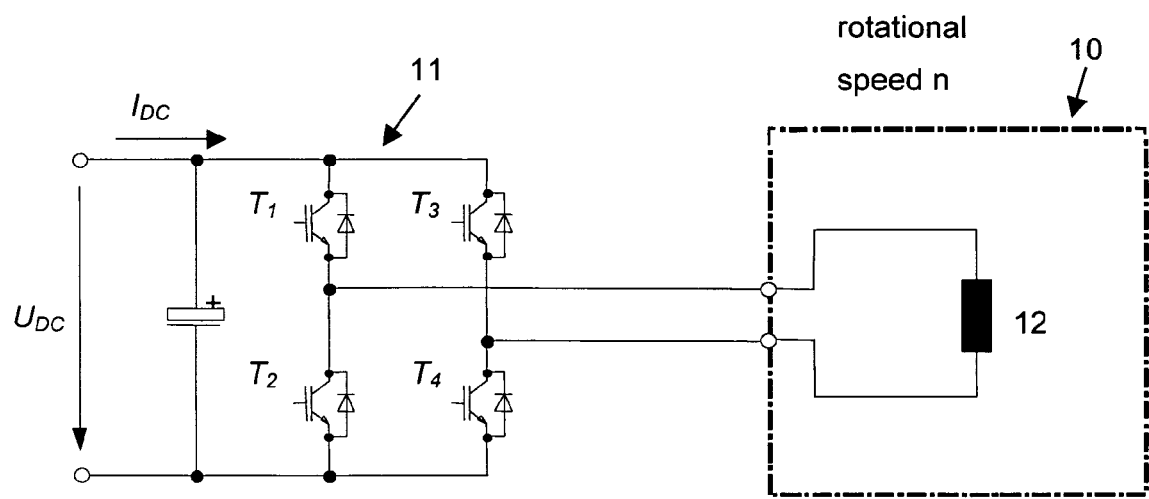
FIG. 1 shows a simplified block diagram of a single-strand, single-phase, bipolar DC motor.

A simplified block diagram of a single-strand, brushless DC motor is shown in FIG. 1. The motor comprises the actual motor 10 as well as the associated motor control 11 which can either be integrated into the motor or provided externally. The single winding 12 of the rotor is energized for an electric angle of 180°, which means that after each 180° the polarity of the supply voltage $U_{DC}$ is switched over by the transistors $T_1$ to $T_4$ of the control 11 and a corresponding motor current $I_{DC}$ flows. These kinds of single-strand, brushless DC motors are used to drive fans, for example.

Figure 2:
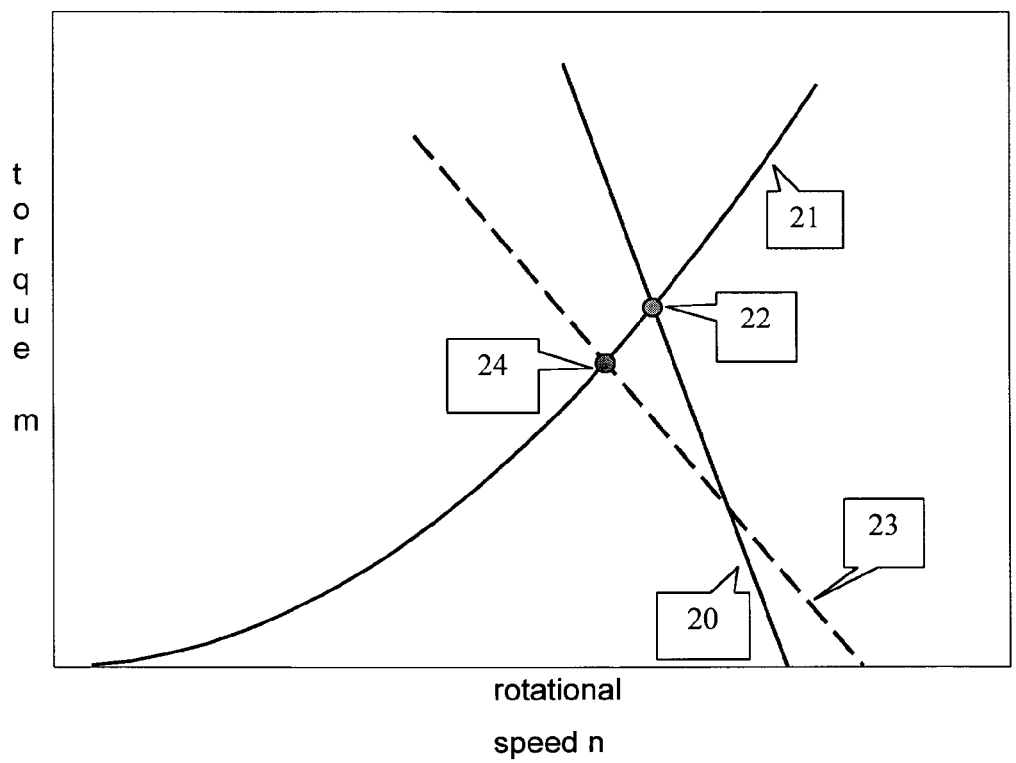
FIG. 2 schematically shows the motor and load characteristic curve of a fan drive.

FIG. 2 shows the typical quadratic characteristic curve of this kind of DC motor when operated as a fan. Here, torque is plotted against rotational speed. The motor characteristic curve at a specific operating voltage is represented by "20". The motor characteristic curve 20 intersects a corresponding load characteristic curve 21 of the fan at operating point 22. At operating point 22, the motor attains a specific efficiency. If a change is made to one or more motor parameters, such as motor voltage, motor current or commutation angle, a different motor characteristic curve 23 is obtained which intersects the load characteristic curve 21 at a different operating point 24. At this operating point 24, the motor operates at a related efficiency η. The commutation angle thus influences the torque-rotational speed characteristic curve of the motor. This means that for each commutation angle there is a different operating point. Since different rotational speed and torque values are associated with each operating point, each operating point also corresponds to a different output power of the motor.

In order to realize the method according to the invention, the input power $P_E$ and the rotational speed of the motor have to be measured. The input power $P_E$ follows from the input voltage $U_{DC}$ and the input current $I_{DC}$. The rotational speed n can be derived from the commutation signal KS which can, for example, be determined from the position of the rotor registered with the aid of Hall sensors.

Figure 3A:
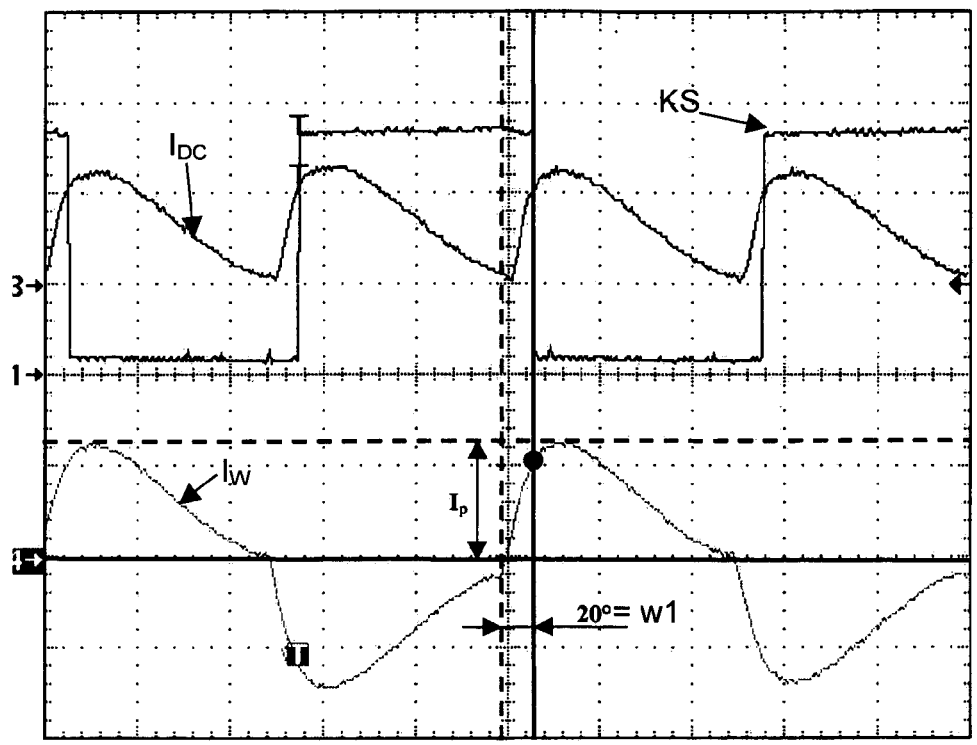
FIG. 3a shows a chart of the motor current ($I_{DC1}$) and the related winding current of a motor according to FIG. 1 at a rotational speed of n1 and a commutation angle of w1.
Figure 3B:
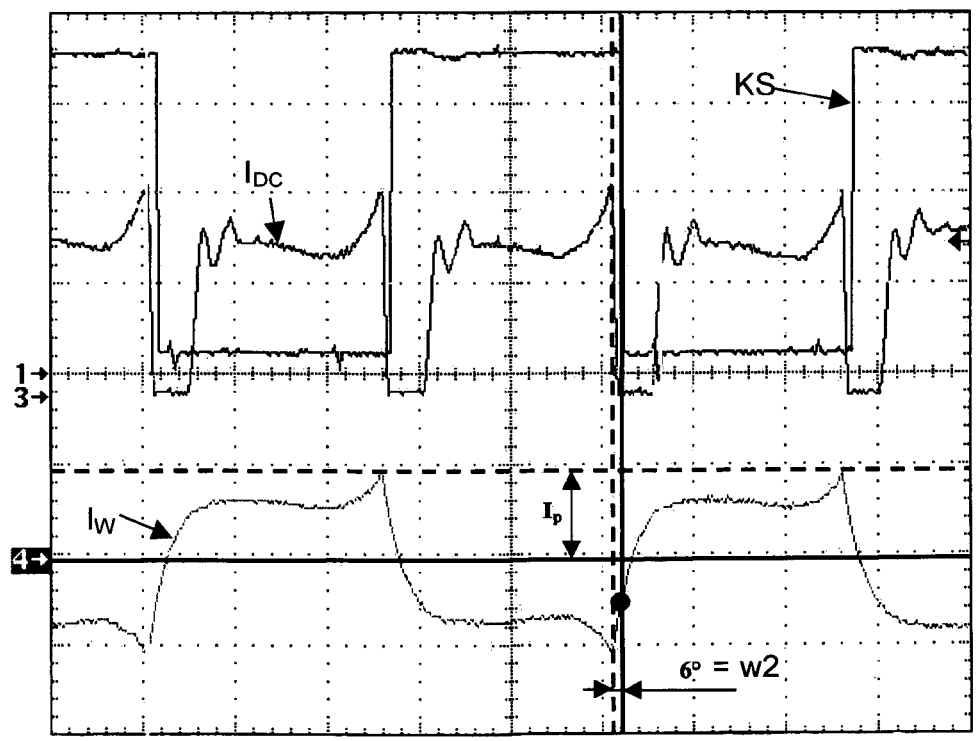
FIG. 3b shows a chart of the motor current ($I_{DC2}$) and the related winding current of a motor according to FIG. 1 at a rotational speed of n2 and a commutation angle of w2.

FIGS. 3a and 3b each show a chart of the commutation signal KS (top), the motor current $I_{DC}$ (middle) and the winding current $I_W$ (bottom) for two different commutation angles of 20° and 6° respectively. It becomes clear that the commutation angle has considerable influence not only on the pattern of the motor current ($I_{DC}$) but also on the peak current ($I_p$) in the winding. This also goes to change the energy consumption of the motor. The commutation angle can thus be used to optimize the efficiency of the motor.

According to the invention, the commutation angle can be used as a free parameter to optimize the efficiency η. When the commutation angle is changed, however, the torque-rotational speed characteristic curve also changes in accordance with FIG. 2. This produces a different operating point which brings about a change in rotational speed. The change in rotational speed also changes the load on the motor, which means it would be wrong to minimize the input power $P_E$. After all, minimum input power occurs when the motor is at a standstill. As opposed to this, the aim according to the invention is to optimize efficiency.

The optimization of efficiency is achieved indirectly by optimizing the introduced factors E or E* respectively. The latter can be used when the supply voltage can be considered a constant or at least independent of the load created by the motor. Since the input current of a brushless DC motor ($I_{DC}$ in FIGS. 3a and 3b) is not an ideal DC current, it is useful to first filter it before digitalization or to measure the average value of $I_{DC}$.

It is important to note that the equations applied only describe the static load of the motor. Dynamic forces are also produced during acceleration or braking. This is why it is important to ensure that the optimum-seeking control arrangement does not provoke any rapid changes in rotational speed (which also makes sense for acoustic reasons) or alternatively it is important to always ensure that a stationary state has been achieved before the measured values are evaluated.

The signals from determining the position, e.g. the output signals of the Hall sensors or EMF analysis, can also be used directly to calculate E or E* respectively. However, since periodic time T is measured here instead of the rotational speed, the following factors can also be used.

$$E_T = 1/E = P_E/n^3 = P_E T^3$$

or $$E_T^* = 1/E^* = I_{DC}/n^3 = I_{DC} T^3$$

These factors make it possible to reduce the necessary computations made by the motor control. Logically, the factors $E_T$ and $E_T^*$ have to be minimized rather than maximized in order to determine the highest efficiency for each.

Figure 4:
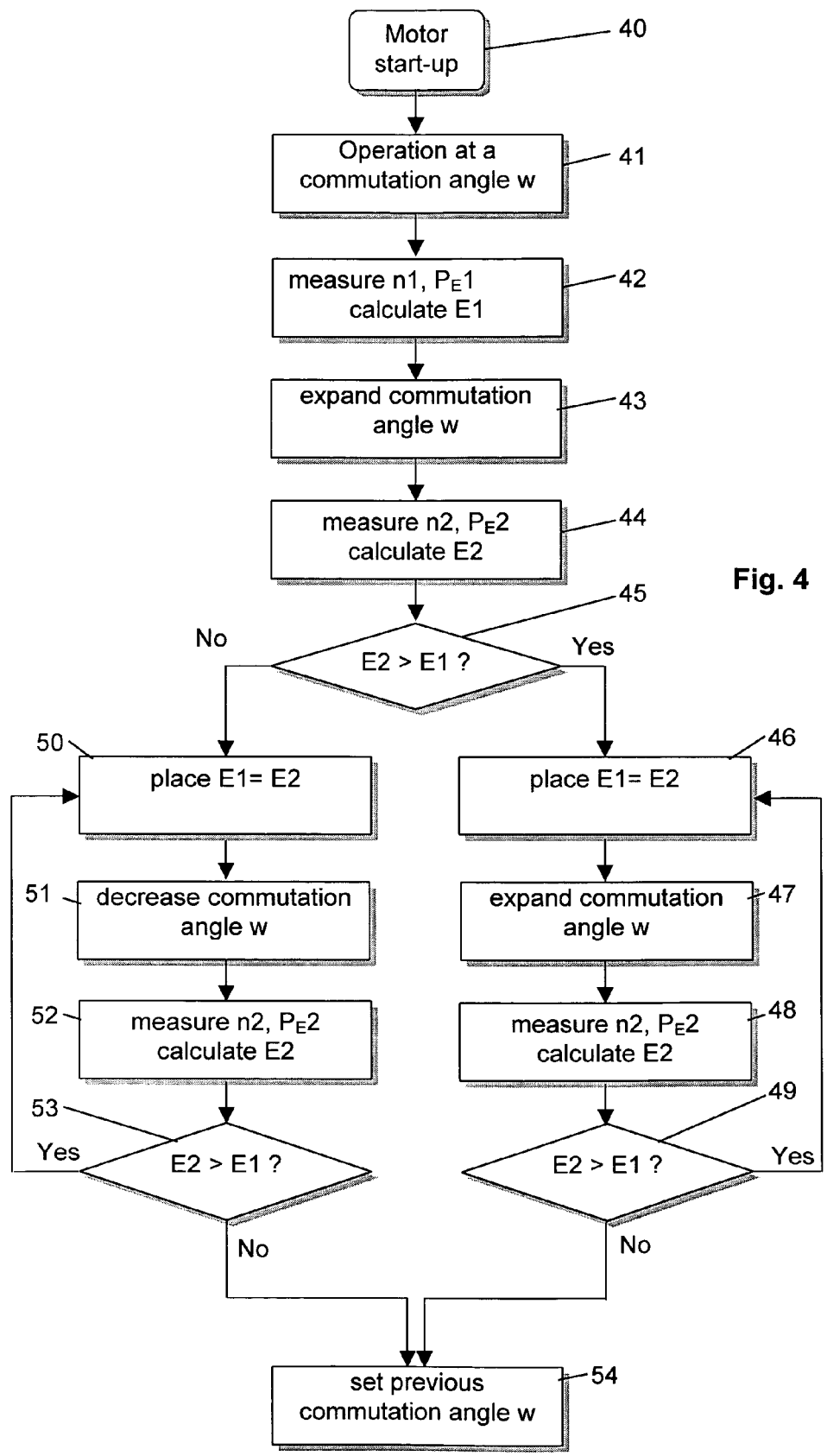
FIG. 4 shows a simplified flow diagram of the method according to the invention.

A simplified flow diagram of the method is illustrated in FIG. 4. Motor start-up in Step 40 is followed by operation at a given commutation angle w (Step 41). In the next step, the actual rotational speed n1 and the input power $P_E1$ are measured. A value $E1=(n1)^3/P_E1$ is calculated from these parameters and saved (Step 42). In accordance with Step 43, the commutation angle is now increased by a given increment, for example by 1°.

The actual rotational speed n2 and the input power $P_E2$ are now measured again. A value $E2=(n2)^3/P_E2$ is calculated from these parameters and saved (Step 44). In Step 45 a comparison is made as to whether E2 is greater than E1. If E2 is greater than E1, the efficiency of the motor has improved. Value E1 is replaced by value E2 (Step 46). The commutation angle is again increased by a given value (Step 47). The actual rotational speed n2 and the input power $P_E2$ are then measured. A value $E2=(n2)^3/P_E2$ is calculated from these parameters and saved (Step 48). In Step 49 a comparison is made as to whether E2 is greater than E1. If E2 is greater than E1, the efficiency of the motor has improved and the procedure continues from Step 46. If E2 is not greater than E1, this means that maximum efficiency had already been reached at the previous commutation angle w. The previous commutation angle is set and the motor is operated at this commutation angle $w_{opt}$ (Step 54).

If the comparison in Step 45 shows that E2 is not greater than E1, this means that the efficiency has declined. Value E1 is replaced by value E2 (Step 50). The commutation angle is now decreased by a given value (Step 51). The actual rotational speed n2 and the input power $P_E2$ are measured. A value $E2=(n2)^3/P_E2$ is calculated from these parameters and saved (Step 52). In Step 53 a comparison is made as to whether E2 is greater than E1. If E2 is greater than E1, the efficiency of the motor has improved and the procedure continues from Step 50. If E2 is not greater than E1, this means that maximum efficiency had already been reached at the previous commutation angle w. The previous commutation angle is set and the motor is operated at this commutation angle $w_{opt}$ (Step 54).

This method allows the maximum value of E2 to be easily found. If the value of E2 reaches its maximum at a commutation angle $w_{opt}$, this means that the motor efficiency is also at a maximum at this angle.

Figure 5:
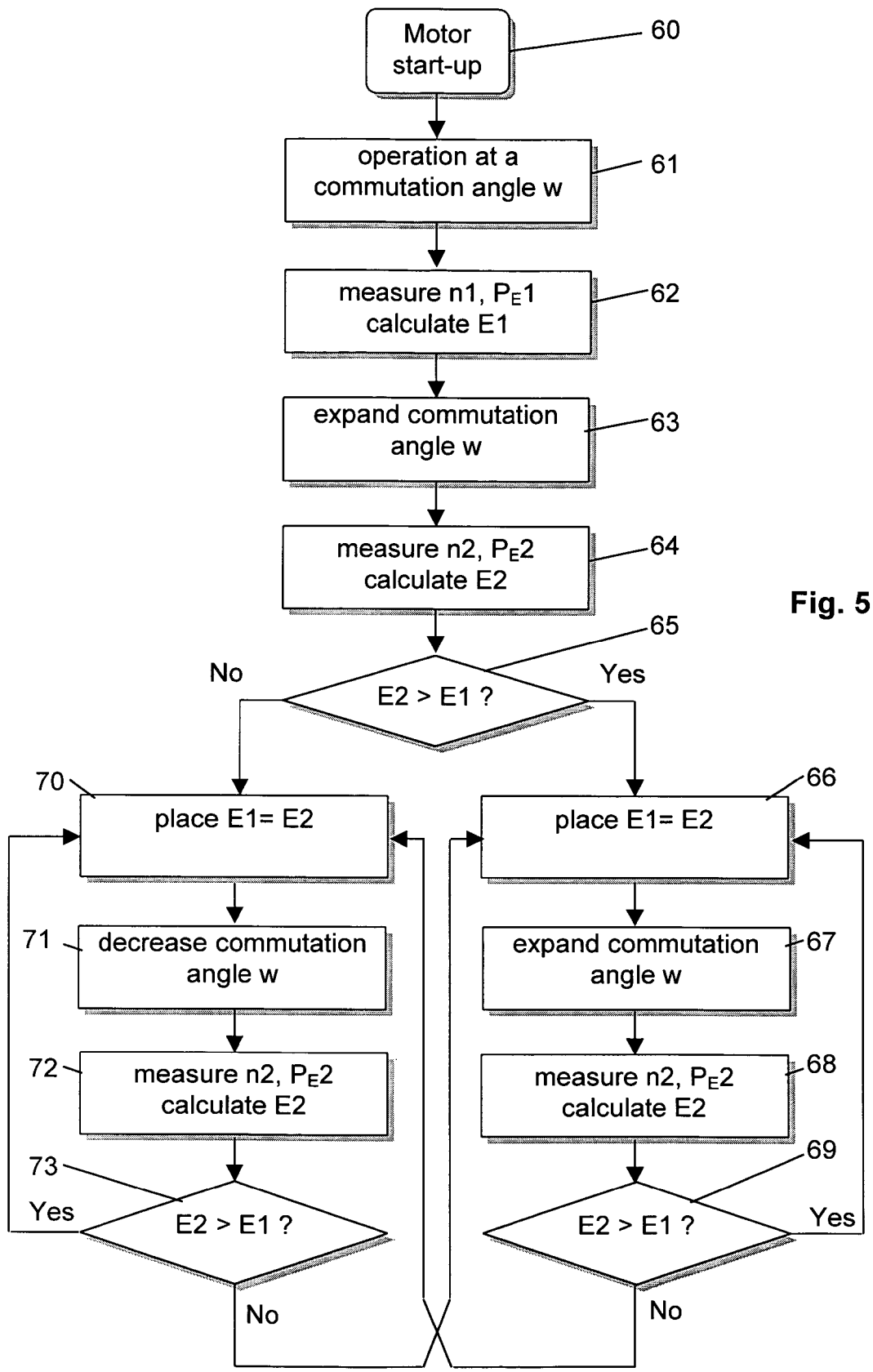
FIG. 5 basically shows the same flow diagram as in FIG. 4 but without the stop criterion (step 54).

The same flow diagram as in FIG. 4 is basically shown in FIG. 5. The procedural steps 60–65 and the associated procedure correspond precisely to the procedural steps 40–45 in FIG. 4.

In Step 65 a comparison is made as to whether E2 is greater than E1. If E2 is greater than E1, the efficiency of the motor has improved. Value E1 is replaced by value E2 (Step 66). The commutation angle is now increased again by a given value (Step 67). The actual rotational speed n2 and the input power $P_E2$ are measured. A value $E2=(n2)^3/P_E2$ is calculated from these parameters and saved (Step 68). In Step 69 a comparison is made as to whether E2 is greater than E1. If E2 is greater than E1, the efficiency of the motor has improved and the procedure continues from Step 66. If E2 is not greater than E1, this means that maximum efficiency had already been reached at the previous commutation angle w. The procedure jumps to Step 70.

The procedure also continues with Step 70 when the comparison in Step 45 shows that E2 is not greater than E1, which means the efficiency has declined. Value E1 is replaced by value E2. The commutation angle is now decreased by a given value (Step 71). The actual rotational speed n2 and the input power $P_E2$ are measured. A value $E2=(n2)^3/P_E2$ is calculated from these parameters and saved (Step 72). In Step 73 a comparison is made as to whether E2 is greater than E1. If E2 is greater than E1, the efficiency of the motor has improved and the procedure continues again from Step 70. If E2 is not greater than E1, this means that maximum efficiency had already been reached at the previous commutation angle w and the procedure jumps to Step 66.

FIG. 5 thus describes a procedure for the continuous optimization of the efficiency of a motor, which could prove advantageous if a motor is operated under load in continuously changing environmental conditions.

IDENTIFICATION REFERENCE LIST

10 Motor
11 Motor control
12 Winding
20 Motor characteristic curve
21 Load characteristic curve
22 Operating point
23 Motor characteristic curve
24 Operating point
40–54 Procedural step (FIG. 4)
60–73 Procedural step (FIG. 5)

The invention claimed is:

1. A method to optimize the efficiency η of a motor (10) operated under a load having an essentially quadratic characteristic curve (21), the motor being connected to a motor control (11) with whose aid at least one free motor parameter w can be changed to influence the efficiency η,
characterized in that
the rotational speed n of the motor is repeatedly determined,
that the input power $P_E$ is repeatedly determined, and
that the motor parameter w is adjusted to a value at which the value E representing the quotient of the cube of the rotational speed n and the input power $P_E$ attains a maximum.

2. A method according to claim 1, characterized in that an electronically commutated DC motor is used as the motor.

3. A method according to claim 2, characterized in that a commutation angle is used as the motor parameter.

4. A method according to claim 1, characterized in that the input power $P_E$ is determined from motor current $I_{DC}$ and motor voltage $U_{DC}$.

5. A method according to claim 1, characterized in that an internal combustion engine is used as the motor.

6. A method according to claim 1, characterized in that an ignition point is used as the motor parameter.

7. A method according to claim 1, characterized in that the input power is determined on the basis of fuel consumption.

8. A method according to claim 1, characterized in that the motor is used to drive fans or pumps.

9. A device to optimize the efficiency h of a motor (10) operated under a load having an essentially quadratic characteristic curve (21), according to the method in accordance with claims 1–6, which comprises:
a means of recording the rotational speed n of the motor,
a means of recording the input power $P_E$ of the motor, and
a motor control (11) with whose aid at least one free motor parameter w can be changed to influence the efficiency h, the motor parameter w being adjusted to a value at which the value E representing the quotient of the cube of the rotational speed n and the input power $P_E$ attains a maximum.

10. A device according to claim 9, characterized in that a commutation angle is the motor parameter.

* * * * *